United States Patent
Kapuria (10) Patent No.: US 10,387,983 B2
(45) Date of Patent: Aug. 20, 2019

(54) AUTOMATED WAREHOUSE MANAGEMENT SYSTEM

(71) Applicant: THE HI-TECH ROBOTIC SYSTEMZ LTD, Gurugram (IN)

(72) Inventor: Anuj Kapuria, Gurugram (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 0 days.

(21) Appl. No.: 15/593,302

(22) Filed: May 11, 2017

(65) Prior Publication Data

US 2018/0108102 A1 Apr. 19, 2018

(30) Foreign Application Priority Data

Sep. 15, 2016 (IN) .............................. 201611031432

(51) Int. Cl.
*G06Q 50/28* (2012.01)
*B65G 1/04* (2006.01)
*B65G 1/137* (2006.01)
*G06Q 10/08* (2012.01)
*G05B 19/418* (2006.01)

(52) U.S. Cl.
CPC .......... *G06Q 50/28* (2013.01); *B65G 1/0492* (2013.01); *B65G 1/137* (2013.01); *G06Q 10/087* (2013.01); *B65G 1/1373* (2013.01); *G05B 19/41895* (2013.01)

(58) Field of Classification Search
CPC .... G06Q 50/28; G06Q 10/087; B65G 1/0492; B65G 1/137
See application file for complete search history.

(56) References Cited

U.S. PATENT DOCUMENTS

| | | | | |
|---|---|---|---|---|
| 7,751,928 B1* | 7/2010 | Antony | ................ | G06Q 10/087 700/214 |
| 8,423,431 B1* | 4/2013 | Rouaix | ................ | B65G 1/1373 705/28 |
| 8,930,133 B2* | 1/2015 | Wurman | ................ | G06Q 10/08 414/334 |
| 9,321,591 B2* | 4/2016 | Lert | ...................... | B65G 1/0492 |
| 9,463,927 B1* | 10/2016 | Theobald | ............. | B65G 1/1373 |
| 9,466,046 B1* | 10/2016 | Theobald | ............. | G06Q 10/087 |
| 9,927,815 B2* | 3/2018 | Nusser | ................. | G05D 1/0287 |
| 9,940,604 B2* | 4/2018 | Galluzzo | ............. | G06Q 10/087 |
| 2005/0238465 A1* | 10/2005 | Razumov | ................ | A47F 10/02 414/273 |
| 2013/0317642 A1* | 11/2013 | Asaria | .................... | G06Q 50/28 700/216 |
| 2016/0167880 A1* | 6/2016 | Pankratov | ............ | B65G 1/0492 414/281 |

* cited by examiner

*Primary Examiner* — Patrick H Mackey (57) ABSTRACT

A warehouse management system (102), an autonomous mobile robot (AMR) (106), and a handheld device (HHD) (108) consolidate orders at a warehouse received from users. A first percentage of orders may be consolidated from at least one regular zone of the warehouse within a predetermined time period. A second percentage of the orders may be consolidated from a manual zone of the warehouse when the first percentage of the orders cannot be consolidated within the predetermined time period. Further, a remaining or a third percentage of the orders may be consolidated from the at least one regular zone or the manual zone in a next iteration of the AMR (106) when at least one item of the plurality of orders is not available in the warehouse.

10 Claims, 7 Drawing Sheets

AUTOMATED WAREHOUSE MANAGEMENT SYSTEM

This application claims priority to the Indian Patent Application No. 201611031432 with the filing date of Oct. 15, 2016, the content of which is incorporated by reference in its entirety herein.

FIELD OF THE INVENTION

The present invention, relates to use of autonomous mobile robots in an automated warehouse and particularly to a system and method of order consolidation using an autonomous mobile robot having an integrated carousal.

BACKGROUND

Usage of automated systems in various industrial applications is known in the state of art. For example, automated systems may be used in manufacturing, packaging, storing, and delivery.

Advent of e-commerce has put high demands on such automated systems. Handling of thousands to millions of orders per day requires careful planning and automation of processes to the extent possible.

In e-commerce, orders are received at a computing platform via the internet or other electronic means. The products or items may be stored in a warehouse where the received orders are fulfilled.

Order fulfillment in a minimum time has been an object of some of the automation in warehouses. However, state of the art systems and methods suffer from several limitations.

Some systems use a mobile drive unit which may dock with an inventory tray carrying items. Docking and undocking of inventory tray is time consuming thus reducing throughput of the system.

Some systems target completion of all orders and may wait if an item is not available. This may result in less productivity as many completed orders are delayed due to non-completion of a few orders.

The present invention overcomes the above and other limitations of the state of art automation in warehouses.

OBJECTS OF THE INVENTION

It is an object of the present invention to provide an autonomous mobile robot with an integrated carousal to be used by a warehouse management system in a warehouse.

It is another object of the present invention to provide a method for automatic order consolidation in a warehouse.

It is yet another object of the present invention to provide a method of order consolidation in a predetermined time period.

It is yet another object of the present invention to provide a method of order consolidation with least amount of travel by the autonomous mobile robot.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The present invention discloses a warehouse management system, the system includes a database, a receiver, and a scheduler communicatively coupled with one another. The receiver is configured to receive a plurality of orders from at least one user. The scheduler is configured to schedule at least one autonomous mobile robot (AMR) to consolidate the orders. A first percentage of the plurality of orders may be consolidated from at least one regular zone of a warehouse within a predetermined time period. A second percentage of the plurality of orders may be consolidated from a manual zone of the warehouse when the first percentage of the plurality of orders cannot be consolidated within the predetermined time period. Further, a third percentage of the plurality of orders may be consolidated from the at least one regular zone or the manual zone in a next iteration of the AMR when at least one item of the plurality of orders is not available in the warehouse.

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF THE DRAWINGS

For a better understanding of the embodiments of the systems and methods described herein, and to show more clearly how they may be carried into effect, reference will now be made, by way of example, to the accompanying drawings, wherein like reference numerals represent like elements/components throughout and wherein.

DETAILED DESCRIPTION

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
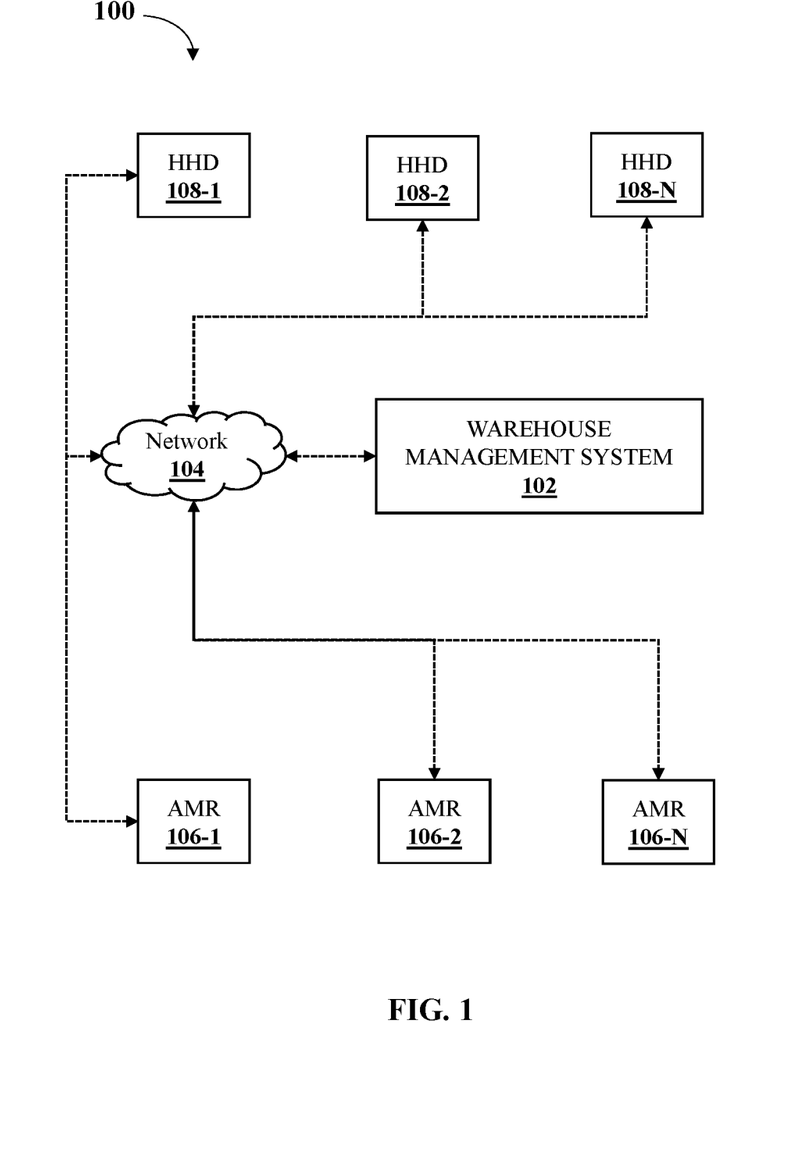
FIG. 1 illustrates a system for order consolidation in a warehouse, according to an embodiment of the present invention.

FIG. 1 illustrates a system 100 for order consolidation in a warehouse, according to an embodiment of the present invention. The system 100 includes a warehouse management system 102 (hereinafter, WMS 102) communicatively coupled to at least one autonomous mobile robot 106-1 to 106-N (hereinafter, AMR 106) and at least one handheld device 108-1 to 108-N (hereinafter, HHD 108) via a network 104.

The WMS 102 may include a server having central control of functioning of the system 100. The WMS 102 receives orders from a user via an electronic communication media.

The WMS 102 may order AMR 106 for order consolidation from the warehouse. The AMR 106 may move to location of items in the warehouse to consolidate the orders and deliver the orders to a delivery zone or section of the warehouse.

In each zone of the warehouse, a picker (human agent) may be located who can pick the items from racks or shelves and provide the items to the AMR 106. Each picker may carry HHD 108 which may communicate with AMR 106. The AMR may be instructed by the WMS 102 to follow the HHD 108 while carrying out order consolidation.

The HHD 108 may be a GPS enabled mobile device. In one embodiment, the HHD 108 may be an electronic tag or any other electronic device capable of communicating with the AMR 106 and the WMS 102.

The WMS 102 may assign a predetermined number of orders to the AMR 106 to be consolidated in a predetermined time period. The number of orders may be based on a holding and carrying capacity of the AMR 106 and/or number of orders received from the user. The WMS 102 may assign orders so that each AMR works at its full capacity and travel a minimum distance within the warehouse.

The AMR 106 is an autonomous mobile robot with integrated carousal. The carousal holds the items belonging to orders being consolidated. One order may carry one or more items. The one or more items may be of same of different item types. Different items may be located in same or different zones of the warehouse.

The WMS 102 may create a map of the layout of the warehouse and update the map if there is any modification the layout. The WMS 102 may provide the map and the updates to the map to the AMR 106 and HHD 108.

The warehouse may be divided into various sections and zones. For example, the warehouse may include, a receiving section, a storage section and a delivery section. The storage section may be divided into various zones. Each zone may include a number of storage racks having multiple vertical levels.

In one embodiment, the warehouse may be a multi-storey building where one floor may be designated as one zone. One zone may include items of one type or items of different but related categories. For example, one zone may store electronic items, another may store books and stationary, another may store clothes, and yet another may include household groceries.

The zones may be of two types, first being regular zones, and second being manual zones. In a regular zone, the AMR goes to each zone automatically depending on location of next item in the current order where a picker may pick the item from the rack and place the item in a designated location of the carousal. If an order cannot be completed from the regular zones, it is completed in the manual zone where a human agent may manually consolidate the order.

A first percentage of the orders may be consolidated from at least one regular zone of a warehouse within a predetermined time period. A second percentage of the orders may be consolidated from a manual zone of the warehouse when the first percentage of the orders cannot be consolidated within the predetermined time period. Further, a third percentage of the orders may be consolidated from the at least one regular zone or the manual zone in a next iteration of the AMR 106 when at least one item of the orders is not available in the warehouse.

Figure 2:
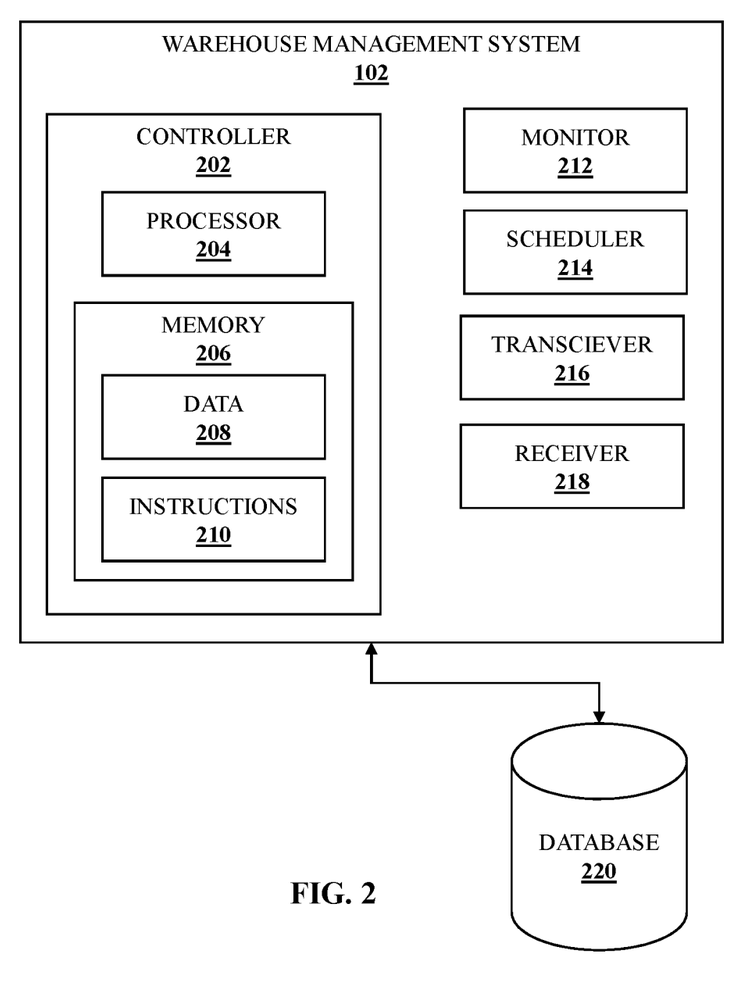
FIG. 2 illustrates a warehouse management system used for order consolidation in a warehouse, according to an embodiment of the present invention.

FIG. 2 illustrates a warehouse management system 102 (WMS 102) used for order consolidation in a warehouse, according to an embodiment of the present invention.

The WMS 102 may include a controller 202, a monitor 212, a scheduler 214, a transceiver 216, and a receiver 218. In one embodiment, the WMS 102 may also be communicatively coupled to an external database 220. In an alternative embodiment, the database 220 may be included in the WMS 102 as an internal database. In on embodiment, the database 220 is a relational database. The database 220 may store a mapping. In one embodiment, the mapping may indicate an item type, a quantity of the item type, and a location of each unit of the item type in a regular zone or a manual zone of the warehouse. The mapping may also indicate a location and an identity of the AMR 106 in the warehouse.

The controller may include a processor 202 communicatively coupled to a memory 206. The memory may include data 208 and instructions 210. In one embodiment, a general purpose computer may be configured to carry out the functions of the controller 202.

The monitor 212, the scheduler 214, the transceiver 216, and the receiver 218 may be implemented in hardware, software, firmware or a combination thereof.

The monitor is configured to monitor status of the WMS 102, the status of the AMR 106 and status of the HHD 108. The monitor may keep track of status of each order received by the receiver 218.

The receiver 218 is configured to receive orders from users. The users may order via the internet using various communication devices such as desktops, laptops, smartphones, or tablets. The received orders may queued by the receiver 218. The received orders may be queued according to a time stamp or a priority or a combination of both. For example, the orders received earlier may be fulfilled first and the other orders may be fulfilled as per a timestamp associated with each order. In another embodiment, the receiver 218 may prioritize orders received during a predetermined time period based on one or more factors. The one or more factors may include but not limited to a premium service requested by a user. The premier service may be offered to the user for a higher price.

The scheduler may be communicatively coupled to the receiver 218 and the database 220. The receiver 218 provides the incoming orders to the scheduler 214. The scheduler 214 may be configured to schedule the AMR 106 to consolidate the orders. A first percentage of the orders may be consolidated from at least one regular zone of a warehouse within a predetermined time period. A second percentage of the orders may be consolidated from a manual zone of the warehouse when the first percentage of the orders cannot be consolidated within the predetermined time period. Further, a third percentage of the orders may be consolidated from the at least one regular zone or the manual zone in a next iteration of the AMR 106 when at least one item of the orders is not available in the warehouse.

In one embodiment, the first percentage may be eighty, the second percentage may be fifteen, and the third percentage may be five. The first, the second, and the third percentages may be configurable. The first, the second, and the third percentages may be configured based on one or more of total number of orders received, priority of orders, availability of AMRs 106, location of items included in the orders.

In one embodiment, the AMR 106 traverses the at least one regular zone of the warehouse until consolidation of the first percentage of the plurality of orders. The AMR 106 traverses to the manual zone of the warehouse on consolidation of the first percentage of the plurality of orders. The AMR 106 may move to a delivery section of the warehouse on consolidation of the first and second percentages of the plurality of orders. The AMR 106 may traverse at least one of the at least one regular zone or the manual zone during the next iteration for consolidating the third percentage of orders of the plurality of orders. In one embodiment, the third percentage of the plurality of orders of a previous iteration may be combined with one or more orders of a subsequent iteration for consolidation.

A human picker may be assigned to the at least one zone, wherein the human picker attends to the AMR 106 within the at least one zone. The at least one zone may include a waiting area for the AMR 106. The AMR 106 may wait in the waiting area for its turn with the picker of the zone. In one embodiment, the waiting area may include a charging station located therein. The charging station may be a wireless charging station. In one embodiment, the AMR 106 may charge itself from the charging station while waiting for the picker to acknowledge its arrival in the zone.

In one embodiment, the AMR 106 is configured to follow the picker based on an acknowledgement of the presence of the AMR 106 in the waiting area and a tracking mechanism. The tracking mechanism may include but not limited to one of a handheld device, an electronic tag and an optical mechanism. In one embodiment, the optical mechanism may include image processing by the AMR 106. For example, the AMR 106 may store images of all pickers of the warehouse and associate the images with the zones. In this way, when the AMR 106 is in a particular zone, the AMR may follow the picker assigned to that zone.

The transceiver 216 may be configured to transmit and receive electronic data to and from the WMS 102. The transceiver 216 may be configured to prioritize the order data over other communication data. The data received may be filtered by the receiver 218 to determine orders received.

Figure 3:
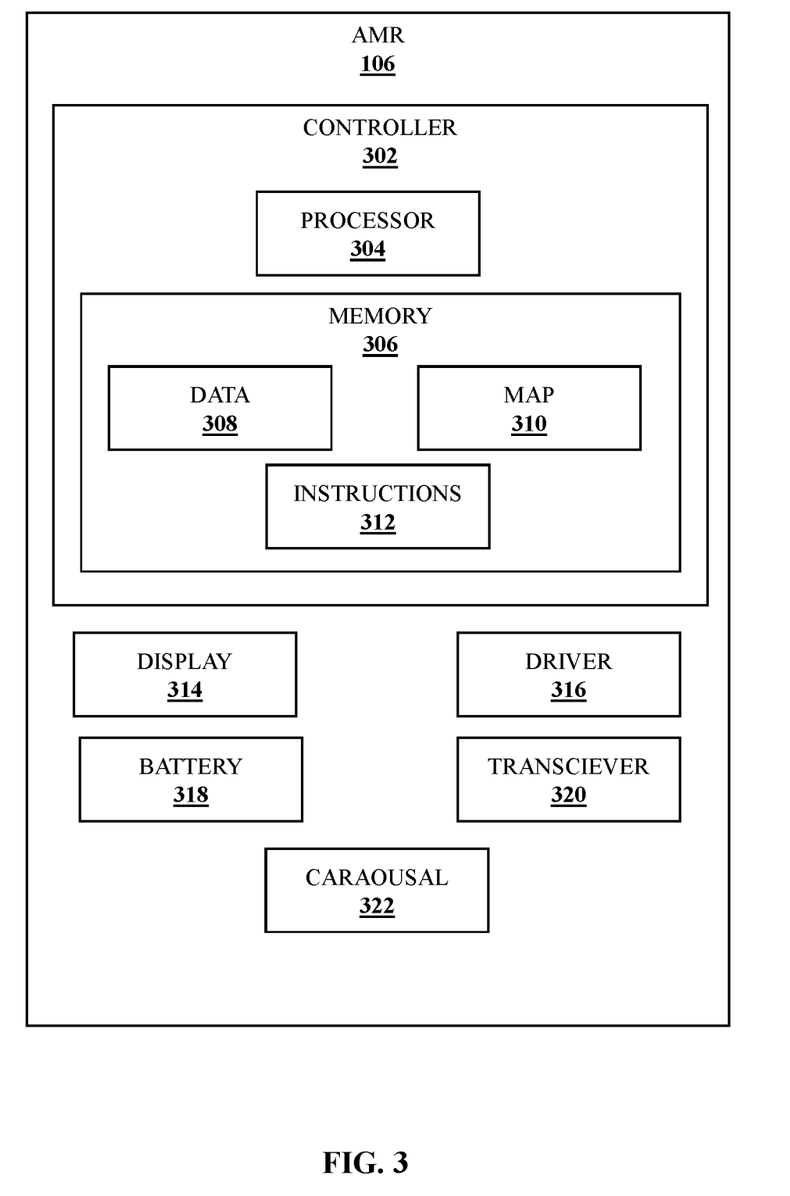
FIG. 3 illustrates an autonomous mobile robot with an integrated carousal, according to an embodiment of the present invention.

FIG. 3 illustrates the AMR 106 with an integrated carousal, according to an embodiment of the present invention. The AMR 106 may include a controller 302, a display 314, a driver 316, a battery 318, and a transceiver 320, and a carousal 322.

The controller 302 may include a processor 304 and a memory 306 communicatively coupled thereto. The memory may store data 308, a map 310, and instructions 312. The processor 304 may read, write or modify the data 308, the map 310, and the instructions 312. The map may include a map of the warehouse. In one embodiment, the controller 302 may be configured to control and monitor a location, a status and a movement of the at least one AMR 106 based on the data 308, the map 310, and the instructions 312.

In one embodiment, the controller 302 is configured to determine an energy level of the battery 318. The controller may charge the battery 318 from a charging station when the energy level falls below a predetermined threshold.

The display 314 may be communicatively coupled to the controller 302. The display 314 may display data sent to it by the controller 302. In one embodiment, orders to be consolidated may be displayed. Further, location of a next item to be picked by the picker may be displayed in form of a map. Consolidation status of various orders may be displayed.

The driver 316 includes drive mechanism for driving the AMR 106 from one location to another location. The drive mechanism may be powered by the battery 318. The battery 318 may be a heavy duty battery to give sufficient power time to the AMR 106. The AMR may charge the battery 318 autonomously using charging stations located in the warehouse. The AMR 106 may send status message "charging" to the WMS 102. In one embodiment, during charging of the battery 318, the WMS 102 may not schedule the AMR 106 for consolidation of orders. The AMR 106 may engage in opportunistic charging, where the AMR 106 charges the battery 318 when no task is assigned to the AMR 106 or while waiting.

The transceiver 320 may be configured to transmit and receive electronic data to and from the AMR 106. The transceiver 320 may be configured to prioritize the order data over other communication data. The transceiver 320 may be configured to communicate with the WMS 102, an electronic tag or a mobile device in possession of the picker, and other AMRs 106. The data received by the transceiver 320 may be processed by the processor 304.

The carousal 322 is integrated with the body of the AMR 106. The carousal 322 may be a vertical rotating carousal. In one embodiment, the carousal may be rotatable in only clockwise direction. In another embodiment, the carousal may be rotatable in only anticlockwise direction. In yet another embodiment, the carousal may be rotatable in both clockwise and anticlockwise directions. The carousal 322 may be rotated by the driver 314 on receiving instruction 312 from the controller.

Figure 4:
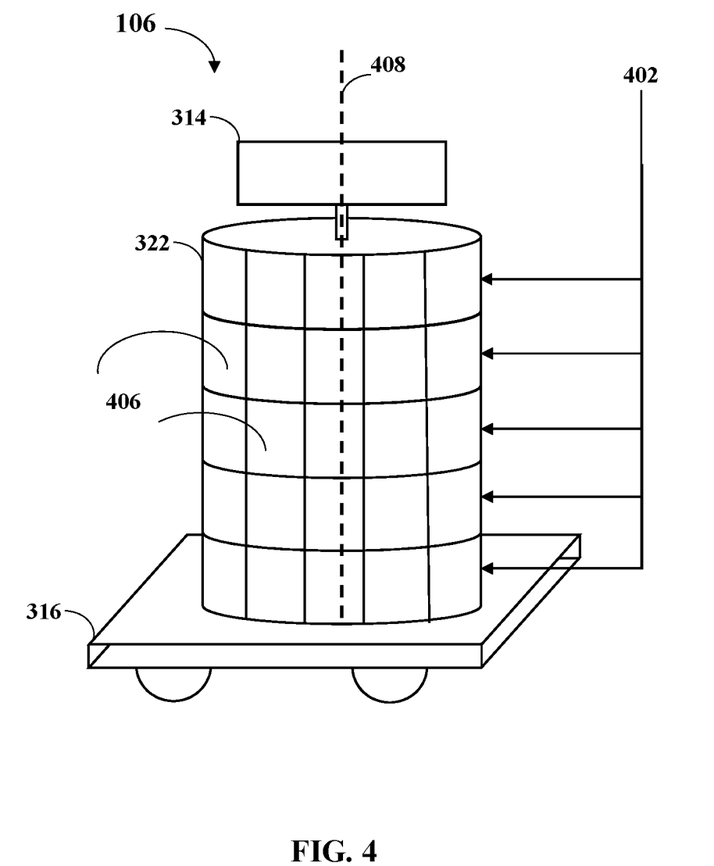
FIG. 4 illustrates the autonomous mobile robot with integrated carousal through a schematic diagram, according to an embodiment of the present invention.

FIG. 4 illustrates the AMR 106 with integrated carousal 322 through a schematic diagram, according to an embodiment of the present invention. The AMR 106 may include the driver 316 and the carousal 322 coupled to the driver 316. In one embodiment, the AMR may include the display 314 coupled to the carousal 322. In another embodiment, the display 314 may be coupled directly to the driver 316. Each of the AMRs 106 may be configured to interact with other AMRs for collision avoidance and route planning.

The carousal 322 may be a vertical carousal. The vertical carousal may be rotatable around an axis 408. The body of the carousal 322 may be fabricated out of metals or alloys or hardened plastic. In one embodiment, the body of the carousal 322 may be made of hard wood. The body may be laminated with hardened plastic to avoid wear due to abrasion or contact with various chemicals or water.

The carousal 322 may be a multilevel carousal. Each level may be formed by two concentric plates arranged around the vertical axis 408 and separated by a predetermined distance. In one embodiment, all the levels 402 are of same height. In alternative embodiment, one or more levels 402 may be of different heights. Different heights may provide for better space utilization depending on size of items to be stored therein. Each level may be divided into one or more bins 406 by using divider plates. The divider plates may be moved to adjust size of the bins 406. Each level of the carousal 322 may be rotated independently of other levels. The rotation may be accomplished by a vertical shaft which may be rotated by the driver 316. The controller 302 may send instructions 312 to the driver 316 to rotate a level of the carousal 322 by a predetermined angle in either clockwise or anti-clockwise direction. The angle and direction of the rotation may be based on location of a bin 406 in the carousal that is needed to be brought to front so that picker may place or retrieve an item from the bin.

Items may be placed in the bins 406 directly or in a packing bag or a box or a basket. The packing bag may be the delivery bag which may be delivered to the user. The delivery bag contains all items ordered by the user. In one embodiment, only items belonging to a single order are placed in a bin.

In one embodiment, each bin 406 may include at least one indicator light. The indicator light may be configured to indicate deposit or withdrawal of an item form the bin 406. In one embodiment, the at least one indicator light may be further configured to indicate status of an order corresponding to the bin (422)

Figure 5:
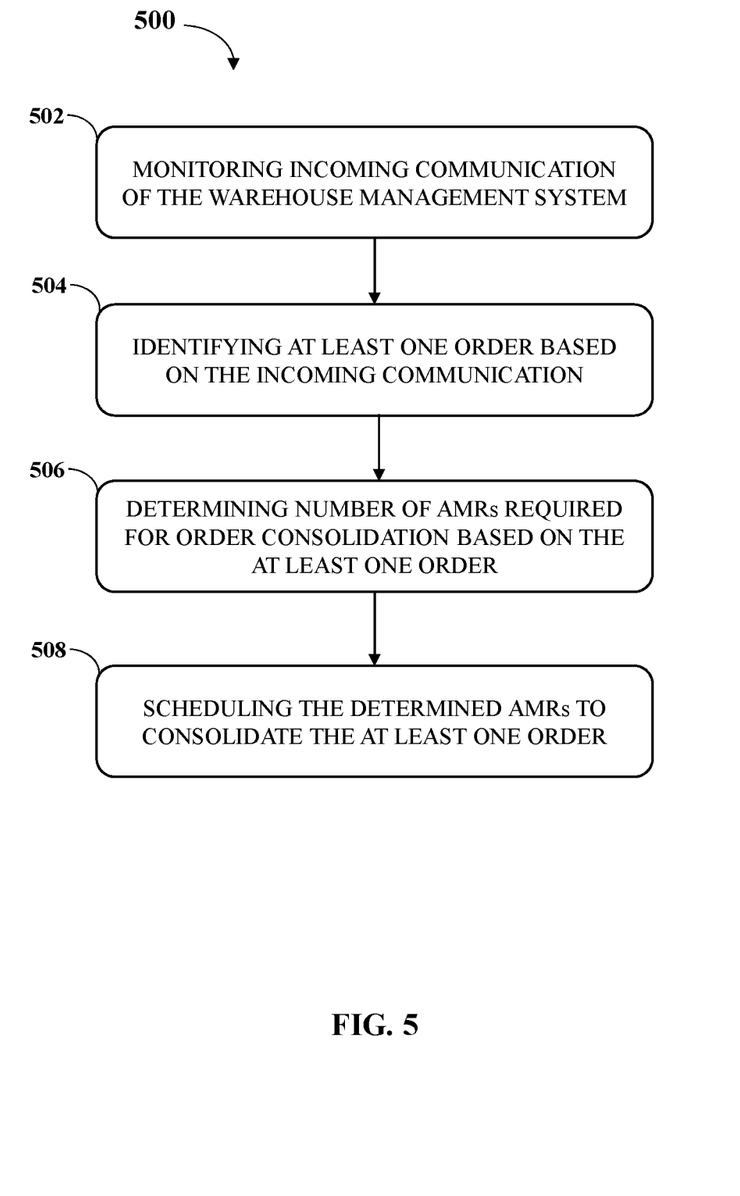
FIG. 5 illustrates a method for scheduling one or more autonomous mobile robots for order consolidation, according to an embodiment of the present invention.

FIG. 5 illustrates a method 500 for scheduling one or more autonomous mobile robots AMR 106 for order consolidation, according to an embodiment of the present invention. The method begins at step 502 where incoming communication at the WMS 102 may be monitored by the receiver. At step 504, at least one order may be identified in the incoming communication data. At step 506, number of AMRs required for order consolidation is determined based on the identified the at least one order. At step 508, the determined AMRs are scheduled to consolidate the at least one order.

Figure 6:
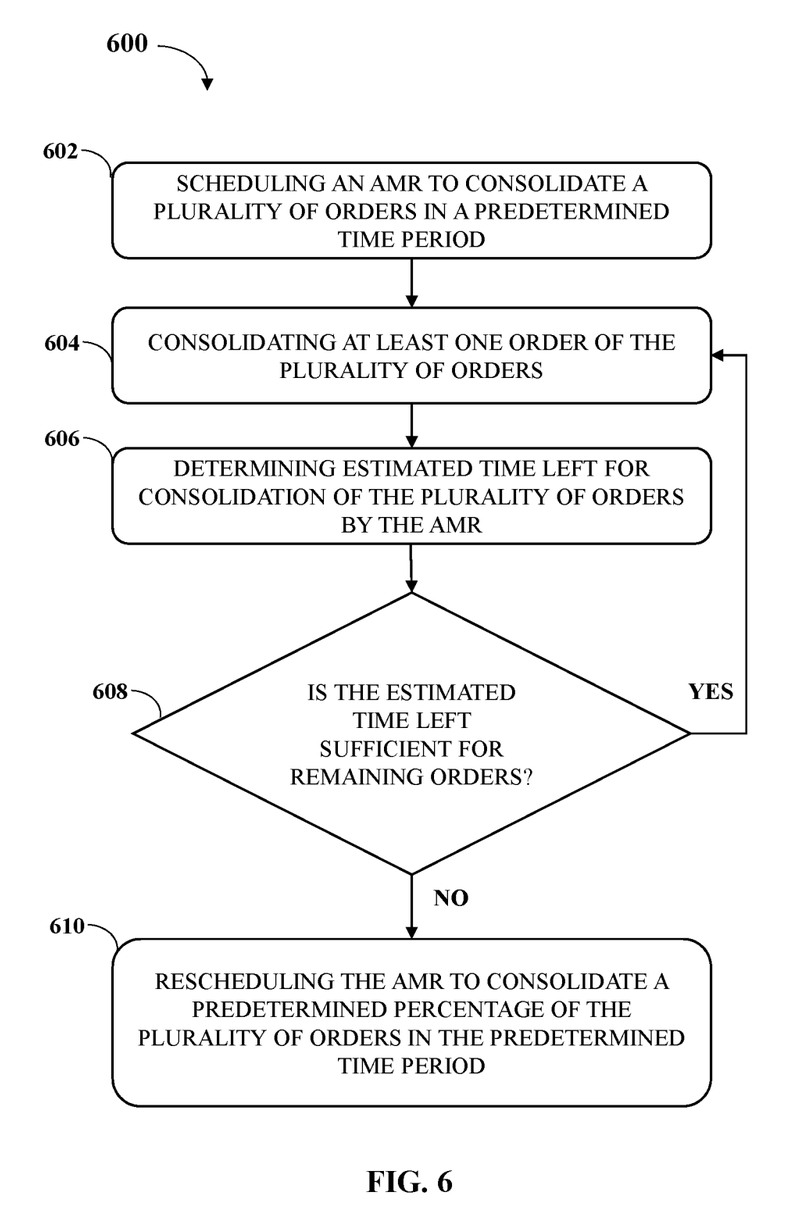
FIG. 6 illustrates a method for rescheduling of an autonomous mobile robot based on an estimated time left for order consolidation, according to an embodiment of the present invention.

FIG. 6 illustrates a method 600 for rescheduling of an autonomous mobile robot (AMR) 106 based on an estimated time left for order consolidation, according to an embodiment of the present invention.

The method 600 begins at step 602. At step 602, an AMR is scheduled to consolidate a plurality of orders in a predetermined time period.

At step 604, at least one of the plurality of orders is consolidated by the AMR 106.

At step 606, estimated time left for consolidation of remaining orders of the plurality of orders is determined.

At step 608, it is determined whether the estimated time left for consolidation of the remaining of the plurality of orders sufficient. If it is determined that the estimated time left is sufficient, the method 600 moves back to step 604 where a next order may be consolidated. However, if it is determined at step 608 that the estimated time left is not sufficient, the method 600 moves to step 610.

At step 610, the AMR is rescheduled to consolidate a predetermined percentage of the plurality of orders in the predetermined time period.

Figure 7:
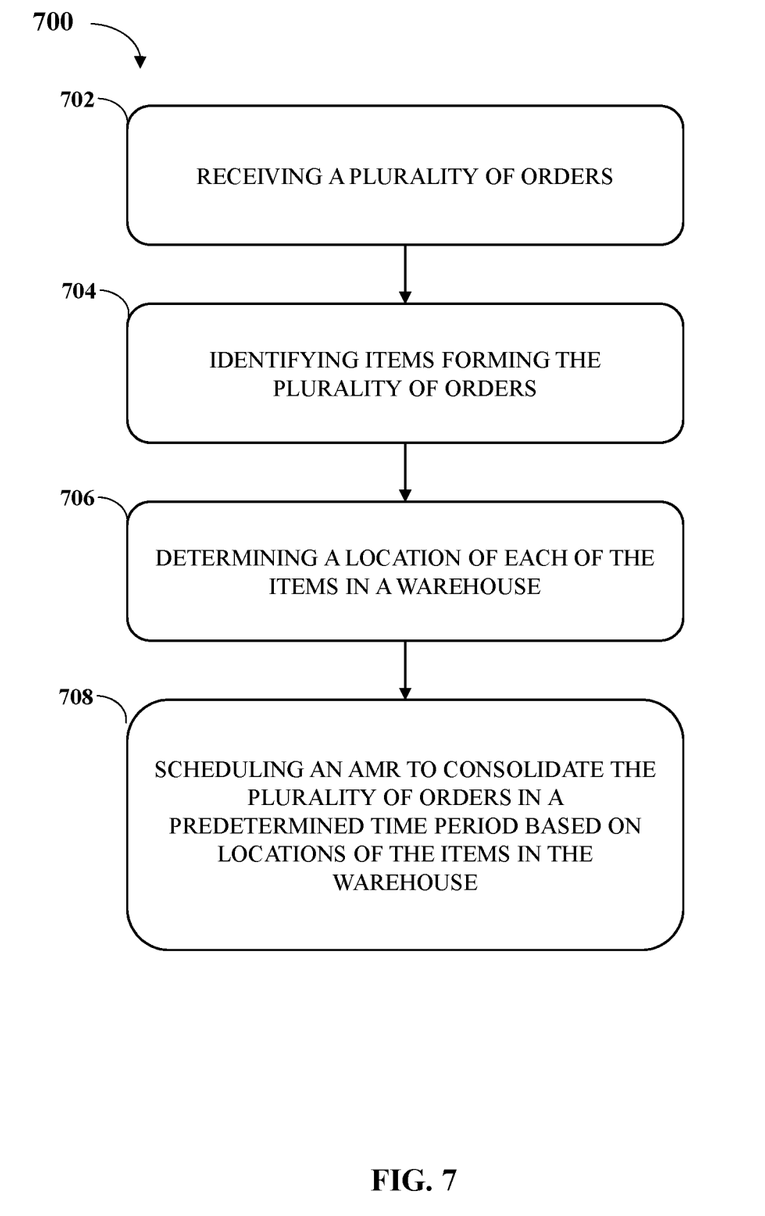
FIG. 7 illustrates a method for scheduling an autonomous mobile robot for order consolidation based on location of various items in a warehouse.

FIG. 7 illustrates a method 700 for scheduling an autonomous mobile robot (AMR) 106 for order consolidation based on location of various items in a warehouse.

The method 700 begins at step 702. At step 702 a plurality of orders are received. At step 704 items in the plurality of orders are identified. At step 706, a location of each item of the plurality of orders is determined in the warehouse. At step 708, the AMR 106 is scheduled to consolidate the plurality of orders in a predetermined time period based on locations of the items in the warehouse.

In yet another embodiment, the warehouse management system (WMS) is a network computer that is couple to remote databases associating a use with an order or e-shopping cart. The user may have placed the order using an ecommerce web portal. Each order may consist of multiple items belonging to various categories available on the web portal. The WMS is configured to monitors and controls a large warehouse having multiple floors with each floor divided into multiple zones. The warehouse comprises a racking system that provides multi-level storage facilities to large number of items with each item marked with a unique identifier or SKU (Stock keeping unit). The unique identifier may a wireless tag or an optical marker. Each item is stored in a specially marked rack with the special marking revealing a location of the rack (in the warehouse) to the WMS. The rack structure may be a multi-level structure. The warehouse may be consists of multiple floors with automatic elevators connecting all the floors. The elevators have communication module to enable the elevator to send/receive instructions from an automated machine like a robot or WMS. Each floor of the warehouse is divided into different zones which define an item category, AMR pathways, human picker stations, charging points, AMR waiting zones, manual order consolidation station, and delivery station. The warehouse floor may be various different zones based upon the use and configuration requirements.

The WMS may receive the database detailing multiple orders associated with different users of an ecommerce website. Each order received by the WMS may consist of a single item or many items. The WMS processes all the received orders and deduce an order consolidation plan (OCP) which comprises a list & quantity of all the items required to consolidate the orders received from the web portal and location of each item in the warehouse. The WMS may access an internal database which stores the rack number and location of each item. Based upon the quantity and location of each item, the WMS creates a trajectory for the AMR. The AMR is an autonomous robot capable of navigating to different floors and zones of the warehouse. For navigation, the AMR may use LiDAR based Simultaneous localization and mapping (SLAM) or any other advance navigation techniques. The AMR may also use radio tags or optical marker place around warehouse infrastructure for better localization. The warehouse employs many AMRs with integrated carousel for picking and consolidation orders. The integrated carousel is a rotatable multi-floor carousel with each floor divided into number of pigeon hole or partitions. Each partition or the pigeon hole is capable of holding multiple items. The carousel also includes a pick-to-light and put-to-light system for visually indicating required pigeon holes to a picker. An AMR with rotating carousel may provide number of benefits over a stationary 2D shelf system. A rotating carousel may position all the relevant pigeon holes in front of a picker and subsequently, the picker may populate the relevant pigeon hole with required items with minimal efforts and time. Additionally, a rotating carousel may also be used to simultaneously attend to different picker standing on opposite sides of the carousel. Since each floor of the carousel is independently rotatable, all the floors may be populated individually which may save a lot of time in order consolidation. The pigeon hole on the carousel may be re-configured to receive items of different sizes and dimensions. The carousal is integrated to base of the AMR and the AMR is capable of moving in any specific direction using its differential drive. The AMR may also include tracks or wheel or any other source of mobility. The AMR is power using an onboard battery module. In some embodiments, the battery may be a high power, long endurance rechargeable battery. The warehouse floors may include designated charging zones where the AMR can automatically charge as per the battery level and OCP. The AMR may also use opportunistic charging in coordination with WMS.

After receive an order, the WMS processes the order which includes making a list of item required to consolidation the order. After processing, WMS may use an internal database to find floor and zone where each item in the order is stored in the warehouse. Subsequently, WMS creates an OCP that includes a marked warehouse map and an AMR trajectory. The items required for consolidation of orders are marked on the warehouse map. The AMR trajectory is calculated based on the item location and total travel distance required to consolidate all the orders. After creating the OCP, the WMS remotely sends the plan to a selected AMR. The WMS may use wireless or wired communication for transmitting OCP to the AMR. The selection of AMR may be based on the charging level, AMR location and carrying capacity. Each of the AMR in warehouse regularly communicate with WMS to register its current location, charging level, estimated range, carousel load and pending orders. Each AMR is given an OCP to fully exploit its loading capacity. For consolidation all the order in an OCP, the AMR has to populate all its pigeon holes with the relevant items and delivery the fulfilled orders to an outbound delivery zone or station. When one of the items associated with an order is not available in the warehouse, the order is marked as leftover. The AMR communicates information about all the leftover orders with the WMS and the WMS may check its internal databased for the availability of the item with the manual order consolidation station or zone. Based on the instructed given by the WMS, the AMR may delivery the leftover orders to a manual order consolidation where a picker can consolidate the leftover orders. Alternatively, the leftover orders may be unloaded at the manual station and kept in a waiting area until they are fulfilled. On the other hand, when the item is made available in some other part of the warehouse or at inbound delivery zone, the WMS instructs the AMR to retain the leftover orders until a new trajectory is received. The WMS may process and allocate subsequent orders of the AMR and the new trajectory may also include items required for consolidation leftover orders. Thus, the order leftover on an AMR carousel may be consolidated in future trajectories.

The method of consolidating order includes steps of
1. WMS get order list.
2. Each order is processed to list all the items required for order consolidation and create location map of each item in the warehouse.
3. The WMS allocates a pre-determined number of orders to an AMR for order consolidation. The WMS creates and send an order consolidation plan to the AMR which includes a list of items required for order consolidation and a map of warehouse where each item is available. The AMR is an autonomous mobile robot with integrated multi-floor rotatable carousel comprising multiple pigeon holes in each floor.
4. For consolidation of each order, all the items specified in each of the order would be picked from warehouse racks and placed in the relevant pigeon holes of the carousel. After the order are consolidated, the items of each pigeon hole are unloaded and shipped to outbound delivery.
5. The WMS has an internal database that stores available items in the warehouse and the rack location for each item. The OCP includes a trajectory that enables the AMR to pick all the items to consolidate orders.
6. In an embodiment, the trajectory may be planned to minimize AMR travel distance in the warehouse and consolidate 80% of order in minimum time.
7. AMR are stationed at waiting/charging zones.
8. Based on the AMR location, loading capacity, and, charging level, each AMR is allocated a pre-determined number of orders to be consolidated. The AMR regularly or in real-time communicates with WMS to transmit information related to carousel capacity, battery stamina, location and other sensory data.
9. The WMS creates a trajectory plan (OCP) based on the information received from the AMR and the order to be consolidated.
10. After receiving the OCP from WMS, the AMR moves to first picker zone and wait for the human picker. The AMR may be enabled to autonomous navigate in the warehouse, moving to various zones, stations and floor as per the need. The AMR is capable of tracking a picker of the zone by using radio or optical tags. Each item category if stored in a specified area (category zone) of the warehouse based on the category type, order frequency, dimension, etc. Each category zone includes a picker zone which may further comprise a waiting area, charging area and order consolidation area.
11. A picker zone may serve multiple item categories such that carousel of a single AMR may be populated by two more picker. Due to individually rotatable multi floor carousel, each side of the carousel may serve a different picker for simultaneously consolidating multiple orders. The AMR may also follow a picker using a tracker attached to the picker. The tracker may be an infrared beacon or RFID tag. The AMR may also use image processing for identifying the picker and following picker movements in the warehouse.
12. The carousel includes a put-to-light system to easily indicate the relevant pigeon hole to the pickers. A display system is attached to the top of the AMR which displays the required item, item location in the warehouse map, quantity, relevant pigeon holes, etc. The display may operate as a secondary communication means in addition to put-to-light system.

13. The AMR may also include an acknowledgment means that may take input from the picker when an item is placed in a pigeon. Thus, the picker may acknowledge that an item required to fulfill an order is completed.

14. In some embodiment, the pigeon holes may be replaced by a delivery box with users postage/contact details marked on the box. The delivery boxes may be directly shipped to the marked address without using any human involvement.

15. Each of the items may have a unique id e.g. SKU that may be scanned by a picker and an AMR using different optical or RF scanning devices. The unique id of the item scanned by picker is communicated to the AMR and a relevant pigeon hole is marked on the carousel using pout-to-light.

16. After picking items from a zone, the AMR sends its present status to the WMS which re-calculates order consolidation plan to fulfill all orders in pre-determined time. If time required to consolidate all the order on an AMR is more than pre-determined, then WMS is configured to create a second OCP which consolidate a predetermined percentage of orders (80%) only. The idea is to consolidate 80% of total orders on an AMR in minimum time and ship the order as soon as possible. The remaining orders may be process in a next trajectory or may be manually consolidated at a manual station.

17. At a delivery station, the consolidated orders are un-loaded from the carousel and sent for delivery.

18. The remaining orders (20%) may be taken to a manual order consolidation station where a picker checks all the remaining order and try to consolidate the order manually using a secondary item storage zone. The secondary item storage zone have store different category items in small quantities. The orders consolidated at the station are further send to shipping and delivery station.

19. The still remaining orders may be marked as leftover and the AMR may take the leftover orders to required picker zones for consolidation of leftover orders. Therefore, using the 80-20% method, most of the orders can be consolidated within minimum time to increase average user satisfaction level.

The 80-20% may be change with the inclusion of infrastructure to the warehouse such as adding more AMR, stocking more items and placing more pickers.

The present disclosure is applicable to all types of on-chip and off chip memories used in various digital electronic circuitry, or in hardware, firmware, or in computer hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously on a programmable system including at least one input device, and at least one output device. Each computer program can be implemented in a high-level procedural or object-oriented programming language or in assembly or machine language, if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (application-specific integrated circuits), FPGAs (field-programmable gate arrays) and/or DSPs (digital signal processors).

It will be apparent to those having ordinary skill in this art that various modifications and variations may be made to the embodiments disclosed herein, consistent with the present disclosure, without departing from the spirit and scope of the present disclosure. Other embodiments consistent with the present disclosure will become apparent from consideration of the specification and the practice of the description disclosed herein.

What is claimed is:

1. An order consolidation system within a warehouse comprising;
    at least one autonomous mobile robot;
    a handheld device, communicatively coupled to the at least one autonomous mobile robot through a network wherein the autonomous mobile robot (106) is configured to follow the handheld device (108) to carry out order consolidation;
    a warehouse management system communicatively coupled to the at least one autonomous mobile robot and the handheld device, wherein the warehouse management system comprises;
        a database;
        a receiver communicatively coupled with the database, wherein the receiver is configured to receive a plurality of orders from at least one user; and
        a scheduler communicatively coupled with the receiver and the database, wherein the scheduler is configured to schedule the at least one autonomous mobile robot to consolidate the plurality of orders from at least one regular zone, or a manual zone of the warehouse, wherein the manual zone is serviced by a designated human picker using the handheld device, wherein the autonomous mobile robot identifies the designated human picker by image analysis of the human picker, and waits for an acknowledgement of arrival to the manual zone from the human picker.

2. The order consolidation system of claim 1, wherein the warehouse management system further includes a controller for overall control of the order consolidation system.

3. The order consolidation system of claim 2, wherein the controller is a server.

4. The order consolidation system of claim 1, wherein the at least one autonomous mobile robot includes at least one rotatable carousel for item storage.

5. The order consolidation system of claim 1, wherein the network is a wireless communication network.

6. The order consolidation system of claim 5, wherein the wireless communication network is one among a Wi-Fi, cellular, WLAN, or ZigBee network.

7. The order consolidation system of claim 1, wherein the handheld device is one among a cellphone, a laptop, a tablet computer, a smart watch, or a handheld control device.

8. The order consolidation system of claim 1, wherein the warehouse management system produces a map to be communicated to the at least one autonomous mobile robot while consolidating the orders within the warehouse.

9. The order consolidation system of claim 1, wherein the warehouse is a multi-story, and multi-racked.

10. The order consolidation system of claim 1, wherein the warehouse has multiple storage category zones.

\* \* \* \* \*